Dec. 24, 1940.  V. M. RHINER  2,226,140
AUTOMATIC AUTOMOBILE DIRECTIONAL SIGNAL
Filed July 13, 1939  2 Sheets-Sheet 1
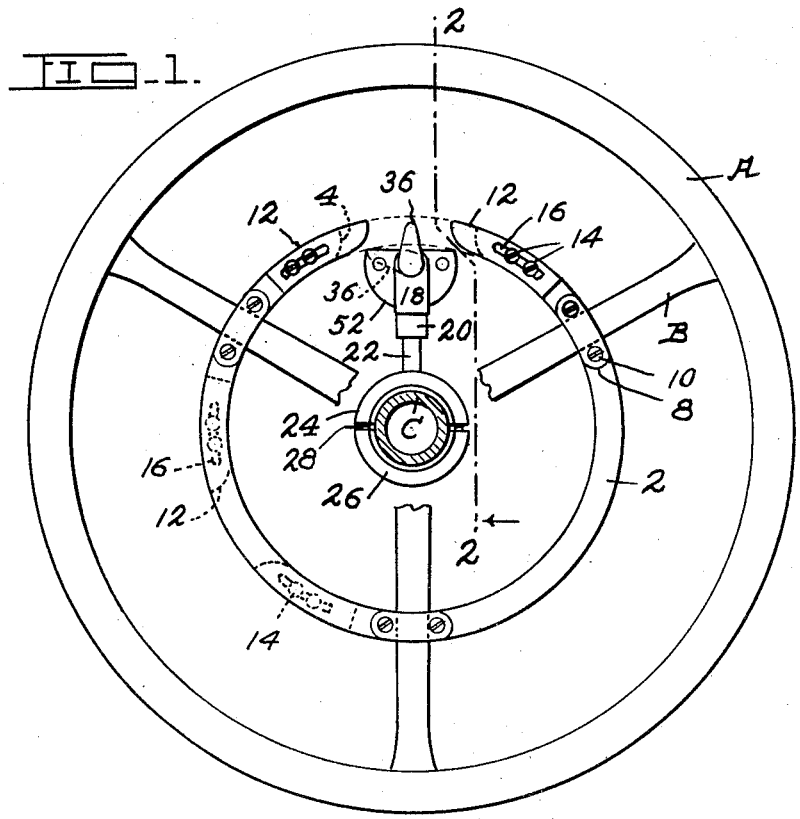
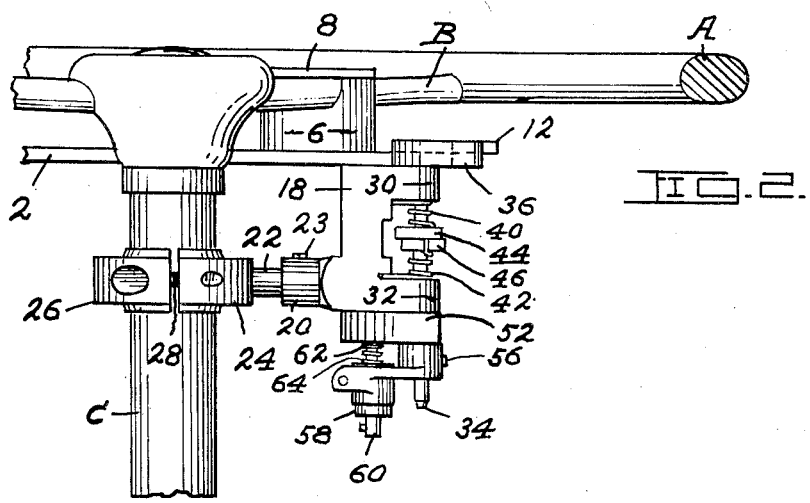
Inventor
Verne M. Rhiner,
F. G. Fischer,
Attorney.

Dec. 24, 1940.  V. M. RHINER  2,226,140
AUTOMATIC AUTOMOBILE DIRECTIONAL SIGNAL
Filed July 13, 1939   2 Sheets-Sheet 2
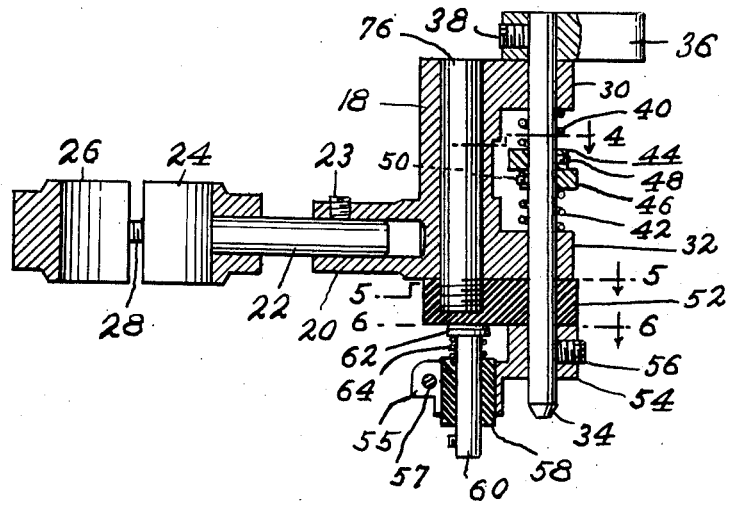
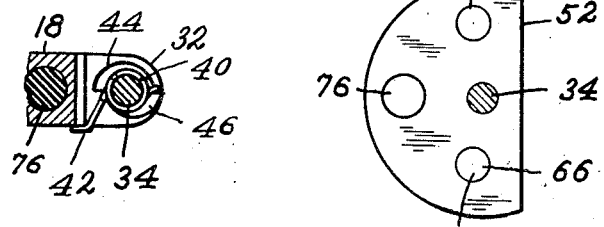
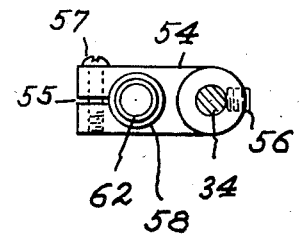
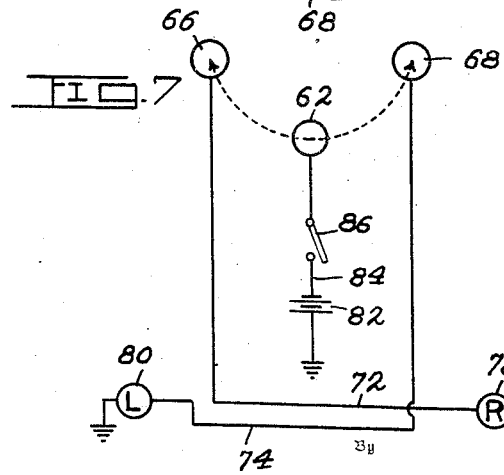
Inventor
Verne M. Rhiner,
F. G. Fischer,
Attorney.

Patented Dec. 24, 1940

2,226,140

UNITED STATES PATENT OFFICE 2,226,140

AUTOMATIC AUTOMOBILE DIRECTIONAL SIGNAL

Verne M. Rhiner, Kansas City, Mo.

Application July 13, 1939, Serial No. 284,274

9 Claims. (Cl. 200—59)

My invention relates to signal means for automobiles to indicate when a right or left turn is about to be made so that drivers approaching from the front or rear will be properly warned.

The signal means being automatic in operation obviates all danger of the driver selecting the wrong signal and allows him to pay full attention to other cars when he is about to make a right or left turn.

An important object of the invention is to provide signal means which is controlled through the steering wheel of the automobile so that when the steering wheel is turned to the right or left the proper signal will be automatically displayed and thereby avoid the possibility of mistakes which might arise if the driver were depended upon to manually select the signals.

Another object of the invention is to provide signal means which is simple in construction, inexpensive to manufacture, reliable in operation, and may be readily applied to cars now in use.

In carrying out my invention right and left signals are employed and a contact controlled by the steering wheel is provided to close the circuit to either signal in accordance with the direction in which the steering wheel is rotated.

In the accompanying drawings,

Fig. 1 is a broken plan view partly in section of a steering wheel and steering column equipped with my signaling means, the signal circuits being omitted.

Fig. 2 is an enlarged irregular broken cross section on line 2—2 of Fig. 1.

Fig. 3 is an enlarged vertical section of certain parts of the invention.

Fig. 4 is a broken cross section on line 4 of Fig. 3.

Fig. 5 is a cross section on line 5—5 of Fig. 3.

Fig. 6 is a cross section on line 6—6 of Fig. 3.

Fig. 7 is a diagram of the electric circuits.

On said drawings, A designates the steering wheel having the customary spokes B and rotatably mounted at the upper end of the usual steering column C.

In carrying out my invention I employ a sector 2 which is secured to the steering wheel A in concentric relation to the steering column C and with its ends 4 spaced equally from opposite sides of an imaginary line extending forwardly from the center of the steering wheel when the front wheels of the motor vehicle are in a straight ahead position. In the present instance I have shown the sector 2 secured to the spokes B of the steering wheel A with blocks 6 placed against the under sides of the spokes, plates 8 placed on top of the spokes and screws 10 placed through holes in the ends of the respective plates 8 and threaded in registering holes in the underlying blocks 6. The sector 2 is equipped with adjustable extensions 12 so that the gap between their ends may be enlarged or reduced to regulate the timing of the signals by adjusting such extensions toward or away from each other. After being adjusted as desired the extensions 12 are firmly secured to the sector with suitable means such as screws 14 extending through slots 16 in the extensions 12 and threaded in holes of the underlying sector.

Supporting means in the form of a bracket 18 is located between the steering column C and the sector 2 as shown on Fig. 1. The bracket 18 is provided near its lower end with a rearwardly extending tubular portion 20 whereby it may be adjusted forward or backward upon a rod 22 and then secured from accidental movement with a set screw 23. The rear end of the rod 22 is provided with an annulus consisting of two separable members 24 and 26 which are firmly clamped to the steering column C with suitable means such as screws 28. The bracket 18 is provided with forwardly projecting upper and lower bearings 30 and 32, respectively, in which a shaft 34 is rockably mounted.

A forwardly extending cam 36 is fixed at its rear end to the upper end of the shaft 34 with suitable means such as a set screw 38 and its free end extends into the gap between the ends of the sector 2 when the cam is in its forward position as disclosed by Fig. 1. The cam 36 is normally held in the straight ahead position shown, with coil springs 40 and 42 bearing at their distal ends against the bearings 30 and 32 and at their adjacent ends against the shoulders of collars 44 and 46 which may be independently rotated upon the shaft 34 to tension the respective springs 40 and 42. After adjustment the collars 44 and 46 are firmly secured to shaft 34 with suitable means such as set screws 48 and 50, respectively. By arranging the springs 40 and 42 as above specified their opposed pressures will yieldably hold the cam 36 in its normal forwardly extending position and will automatically return the cam to such position after it has been turned to the right or left.

The shaft 34 extends down through an insulator 52 and is provided at its lower end with an arm 54 firmly secured at its forward end to the shaft with suitable means such as a set screw 56. The split rear portion 55 of the arm 54 is firmly clamped by a screw 57 to a bushing 58 of insulating material in which the shaft 60 of an electrical contact 62 is slidably mounted. The contact 62 is pressed against the under side of the insulator 52 with a coil spring 64 interposed between the top of the bushing 58 and the enlarged upper end of the contact 62.

The slidable contact 62 is adapted to coact with contacts 66 and 68 in closing right and left signal circuits 72 and 74, respectively. The contacts 66 and 68 are spaced equally in opposite directions from the shaft 34 and fixed in the insulator 52 which is rigidly secured to the bracket 18 with a threaded member 76 consisting preferably of insulating material.

The signal circuits 72 and 74 are equipped with suitable right and left signals shown in the present instance in the form of lamps 78 and 80, respectively. The slidable contact 62 is connected through a circuit wire 84 to a suitable source of electrical energy 82 which may be the battery of the motor vehicle. A manual switch 86 is provided for holding the circuit wire 84 open when desired such, for instance, as when the motor vehicle is parked with the front wheels turned towards the curbing. However, in modern cars switch 86 may be dispensed with as the battery circuit is opened and closed with a removable key.

The operation briefly stated is as follows: When the steering wheel A is rotated to the left the sector 2 is carried therewith as indicated by dotted lines, Fig. 1, and turns the cam 36 to the left. The cam 36 turns shaft 34 which turns arm 54 to the right and thus carries the contact 62 into engagement with contact 68 to close the circuit 74 which crosses circuit 72, as shown by Fig. 7. The circuit 74 remains closed until the front wheels of the motor vehicle are restored to a straight ahead position, whereupon the cam 36 is automatically restored to a straight ahead position by the springs 40 and 42 acting on the shaft 34.

When the steering wheel A is turned to the right it turns the cam 36 to the right which effects closing of the circuit 72 through contacts 62 and 66.

From the foregoing description it is apparent that I have provided signalling means possessing the advantages above pointed out and while I have shown a preferred embodiment of the invention I reserve all rights to such other forms and modifications thereof as properly fall within the spirit and scope of the invention as claimed.

Having thus described my invention, what I claim and desire to secure by Letters Patent is:—

1. Signal means for motor vehicles comprising a bracket having bearings and adapted to be secured to the steering column of the motor vehicle, an insulator secured to said bracket, a pair of spaced electrical contacts fixed to said insulator and one of which is adapted to be connected to a right signal circuit and the other to a left signal circuit, a slidable electrical contact adapted to be connected to a source of electrical energy and engage either of the fixed contacts to close the respective signal circuits, a shaft mounted in the bearings of the bracket, an arm secured to said shaft and carrying the slidable contact, a cam secured to said shaft, and a sector adapted to be secured to the steering wheel of the motor vehicle and rock said cam to the right or left in accordance with the direction in which the steering wheel is operated.

2. Signal means for motor vehicles comprising a sector adapted to be secured to the steering wheel of a motor vehicle, an annulus adapted to be clamped to the steering column of the motor vehicle and provided with a rod, a bracket mounted upon said rod and adapted to be moved toward or away from the gap between the ends of the sector, means for securing said bracket against accidental movement upon the rod, an insulator secured to the bracket, a pair of spaced electrical contacts fixed to said insulator and one of which is adapted to be connected to a right signal circuit and the other to a left signal circuit, a slidable contact adapted to be connected to an electrical source of energy and engage either of the fixed contacts to close the respective signal circuits, an arm in which said slidable contact is mounted, a shaft mounted in the bracket and to which said arm is secured, and means secured to said shaft and adapted to be rocked to the right or left by the sector in accordance with the direction in which the steering wheel is rotated.

3. In combination with the steering wheel and the steering column of a motor vehicle, a sector arranged concentrically with and secured to the steering wheel, a cam having a free end to project into the gap between the ends of the sector so the cam will be operated by the sector engaging said free end when the steering wheel is rotated to the right or left, a shaft upon which said cam is fixed, supporting means secured to the steering column and in which said shaft is operably mounted, resilient means for normally holding the shaft in position to retain the free end of the cam midway, or approximately midway, of the gap when the front wheels of the motor vehicle are in a straight ahead position, a pair of electrical contacts fixed to the supporting means, an arm fixed to the shaft, and an electrical contact mounted in said arm for engagement with either of said fixed contacts.

4. In combination with the steering wheel and the steering column of a motor vehicle, a sector arranged concentrically with and secured to the steering wheel, a cam having a free end to project into the gap between the ends of the sector so the cam will be operated by the sector engaging said free end when the steering wheel is rotated to the right or lift, a shaft upon which said cam is fixed, supporting means secured to the steering column and in which said shaft is operably mounted, two coiled springs mounted upon the shaft and having their distal ends engaging the supporting means, two elements independently adjustable upon the shaft and engaging the adjacent ends of said springs to tension the same and yieldably hold the shaft in position to retain the free end of the cam midway, or approximately midway, of the gap when the front wheels of the motor vehicle are in a straight ahead position, a pair of electrical contacts fixed to the supporting means, and an electrical contact controlled by the shaft for engagement with either of said fixed contacts.

5. In combination with the steering wheel and the steering column of a motor vehicle, a sector arranged concentrically with and secured to the steering wheel, a cam having a free end to project into the gap between the ends of the sector so the cam will be operated by the sector engaging said free end when the steering wheel is rotated to the right or left, a shaft upon which said cam is fixed, supporting means secured to the steering column and in which said shaft is operably mounted, resilient means for normally holding the shaft in position to retain the free end of the cam midway, or approximately midway, of the gap when the front wheels of the motor vehicle are in a straight ahead position, a pair of electrical contacts fixed to the supporting means, an electrical contact controlled by the shaft for engagement with either of said fixed contacts, and a pair of extensions adjustably secured to the sector to vary the width of the gap.

6. Signal means for motor vehicles comprising a vertical bracket, means for securing said bracket to the steering column of a motor vehicle, an insulator secured to the lower end of said bracket, spaced electrical contacts fixed to said insulator and adapted to be connected to right and left signals, a slidable electrical contact adapted to be connected to a source of electrical energy, an arm carrying said slidable contact and adapted to move the same into engagement with either of the fixed contacts, spring means for pressing said slidable contact against the insulator or the spaced contacts, a shaft mounted in the bracket and extending through the insulator at a point midway between the fixed contacts, means for securing the arm to the lower portion of said shaft, a cam fixed to the upper portion of the shaft, and a sector secured to the steering wheel of the motor vehicle for turning said cam to effect closure of the left signal circuit when the steering wheel is turned to the left or effect closure of the right signal circuit when the steering wheel is turned to the right.

7. In signal means for motor vehicles, supporting means secured to the steering column of the motor vehicle, a shaft operably mounted in said supporting means, an arm fixed to said shaft, a movable contact carried by said arm and adapted to be connected to a source of electrical energy, a pair of fixed contacts carried by the supporting means and spaced equally from opposite portions of the shaft and in the path of the movable contact, said fixed contacts being adapted for connection to respective right and left signal circuits, and coacting means fixed respectively to the steering wheel of the motor vehicle and the shaft for operating said shaft.

8. In signal means for motor vehicles, supporting means secured to the steering column of the motor vehicle, a shaft operably mounted in said supporting means, an arm fixed to said shaft, a movable contact carried by said arm and adapted to be connected to a source of electrical energy, a pair of fixed contacts carried by the supporting means and spaced equally from opposite portions of the shaft and in the path of the movable contact, said fixed contacts being adapted for connection to respective right and left signal circuits, spring means mounted upon the shaft and engaging the supporting means for yieldably holding the shaft in position to normally retain the movable contact midway between the fixed contacts, and coacting means fixed respectively to the steering wheel of the motor vehicle and the shaft for operating said shaft.

9. In signal means for motor vehicles, supporting means secured to the steering column of the motor vehicle, a shaft operably mounted in said supporting means, a movable contact controlled by said shaft, a pair of fixed contacts carried by the supporting means and spaced equally from opposite portions of the shaft and in the path of the movable contact, a pair of springs associated with the shaft and tending to rotate the same in opposite directions to thereby yieldably hold the movable contact normally out of engagement with the fixed contacts, and coacting means fixed respectively to the steering wheel of the motor vehicle and the shaft for operating said shaft.

VERNE M. RHINER.